United States Patent [19]
Lowe

[11] Patent Number: 6,016,513
[45] Date of Patent: Jan. 18, 2000

[54] METHOD OF PREVENTING PACKET LOSS DURING TRANSFERS OF DATA PACKETS BETWEEN A NETWORK INTERFACE CARD AND AN OPERATING SYSTEM OF A COMPUTER

[75] Inventor: Glen H. Lowe, Union City, Calif.

[73] Assignee: 3Com Corporation, Santa Clara, Calif.

[21] Appl. No.: 09/025,960

[22] Filed: Feb. 19, 1998

[51] Int. Cl.[7] ................................................. G06F 13/00
[52] U.S. Cl. ........................................ 709/250; 370/463
[58] Field of Search ............................ 370/463; 709/203, 709/231, 234, 250; 710/52, 53, 131; 711/100, 119

[56] References Cited

U.S. PATENT DOCUMENTS

| | | | |
|---|---|---|---|
| 5,210,749 | 5/1993 | Firoozmand | 370/463 |
| 5,390,299 | 2/1995 | Rege et al. | 709/250 X |
| 5,412,782 | 5/1995 | Hausman et al. | 709/250 |
| 5,533,203 | 7/1996 | Fischer et al. | 710/52 |
| 5,579,503 | 11/1996 | Osborne | 709/234 X |
| 5,751,951 | 5/1998 | Osborne et al. | 709/250 |
| 5,761,433 | 6/1998 | Billings | 709/231 |
| 5,790,893 | 8/1998 | Polge et al. | 710/53 |
| 5,799,150 | 8/1998 | Hamilton et al. | 709/203 |
| 5,859,980 | 1/1999 | Kalkunte | 709/231 |

OTHER PUBLICATIONS

Bengt Ahlgren, A Host Interface to the DTM High Speed Network, IEEE, pp. 1–5, Nov. 1991.

*Primary Examiner*—Zarni Maung
*Assistant Examiner*—Patrice Winder
*Attorney, Agent, or Firm*—Wagner Murabito & Hao LLP

[57] ABSTRACT

A method of preventing packet loss when data packets are transferred from a network interface card to a host operating system of a computer. Incoming data packets received by the network interface card are processed in bursts of N data packets, where N is a maximum number of data packets that can be handled by the host operating system. At the end of each burst, a signal is sent to the host operating system that the burst constitutes all the incoming data packets. In one embodiment of the present invention, the signal, which falsely indicates that the transaction is complete, also enables the host operating system to receive another burst of the data packets. The process may be repeated until all the incoming data packets are received by the host operating system. In another embodiment of the present invention, after processing a burst of N data packets, a future hardware interrupt is scheduled and a signal falsely indicating that the burst constitutes all of the incoming data packets is sent. The future hardware interrupt, coupled with the signal, enables the host operating system to receive a stream of data packets without packet loss.

26 Claims, 4 Drawing Sheets

METHOD OF PREVENTING PACKET LOSS DURING TRANSFERS OF DATA PACKETS BETWEEN A NETWORK INTERFACE CARD AND AN OPERATING SYSTEM OF A COMPUTER

FIELD OF THE INVENTION

The present invention generally pertains to the field of computer networking. More particularly, the present invention is related to a mechanism for transferring data packets between a network interface card (NIC) and an operating system of a computer.

BACKGROUND OF THE INVENTION

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

One popular type of computer network is known as local area networks or LANs. LANs connect multiple computers together such that the users of the computers can access the same information and share data. Typically, in order to be connected to a LAN, a general purpose computer requires an expansion board generally known as a network interface card (NIC). Essentially, the NIC works with the operating system of the host computer to control the flow of information over the LAN. Some NICs may also be used to connect a computer to the Internet.

The NIC, like other hardware devices, requires a device driver which controls the physical functions of the NIC and coordinates data transfers between the card and the host operating system. An industry standard for interfacing between the device driver and the host operating system is known as the Network Device Interface Specification, or NDIS, which is developed by Microsoft Corporation of Redmond, Washington. The operating system layer implementing the NDIS interface is generally known as an NDIS wrapper. Functionally, the NDIS wrapper arbitrates the control of the device driver between various application programs and provides temporary storage for the data packets.

Currently, NDIS is implemented in many operating systems including Microsoft's Windows 95™. According to the NDIS, when data packets arrive at the NIC, the network device driver will initiate a data transaction and will indicate to the host operating system that there are incoming data packets waiting to-be received. Usually, the host operating system will acknowledge the presence of the incoming data packets and will signal the network device driver to transfer the packets. When all the data packets have been transferred, the network device driver then signals the host operating system that the transaction is complete. In particular, an NdisMIndicateReceiveComplete routine is called at the end of the transaction. In some operating systems implementing NDIS, virtually any number of data packets may be transferred in one transaction.

However, in other operating systems, such as Windows 95™, data packets are sometimes ignored or dropped when the NIC attempts to transfer more than a certain number of incoming data packets to the host in one transaction. Any additional data packets will be ignored or dropped. As a result, it is necessary to re-transmit the ignored data packets across the network to the NIC until all the data packets are received and processed by the operating system. Retransmission of ignored or dropped data packets significantly increases network traffic and transmission latency. In addition, performance of new, high-speed, high performance network hardware is unexpectedly poor when used in conjunction with those operating systems.

Much effort has been expended to solve this problem. One solution is extensively to modify the existing operating systems to handle a larger number of data packets per transaction. However, that solution is not feasible as the costs of reverse engineering and modifying the existing operating systems are prohibitively expensive. Further, any modification to the existing operating systems may cause compatibility problems and may introduce other unforeseeable software glitches. Thus, what is needed is a method of an apparatus for preventing packet loss when data packets are transferred from an NIC to an operating system of a computer. The present invention offers a unique and novel solution whereby extensive modifications to the operating system are unnecessary. The solution offered by the present invention is also relatively inexpensive and may be implemented in many of today's network interface cards and operating systems.

SUMMARY OF THE INVENTION

The present invention is a method of preventing packet loss when data packets are transferred from a network interface card (NIC) to a host operating system. According to one embodiment of the present invention, a plurality of incoming data packets are transferred from the NIC to the host operating system in bursts of N packets, where N is a maximum number of incoming data packets the host operating system can receive without packet loss. At the end of each burst, a signal is sent to the host operating system falsely indicating that all of the incoming data packets are transferred. This false indication will "trick" the host operating system to flush its buffers. As a result, the host operating system is enabled to receive the next burst of data packets. The process may be repeated until the all data packets are transferred. In this way, the buffers are never overflowed by the incoming data packets, and, accordingly, packet loss is effectively prevented.

In another embodiment of the present invention, a plurality of incoming data packets are transferred from the NIC to the host operating system in bursts of N data packets. After processing a burst of N data packets, a future hardware interrupt is scheduled. Then, a signal is sent to the host operating system falsely indicating that all of the incoming data packets are transferred. The host operating system, upon receiving such a signal, will flush its buffers. When the hardware interrupt occurs, the host operating system will be triggered by the hardware interrupt to process a next burst of data packets. The process may be repeated until all of the incoming data packets are received by the host operating system.

In the present embodiment, the host operating system is preferably compatible with 80x86-family microprocessors. In addition, the present embodiment is preferably practiced in a computer having a NDIS compliant network interface card. In furtherance of the present embodiment, each burst preferably includes eight data packets. Further, the present invention may be implemented in a device driver software of the network interface card.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

Unless specifically stated otherwise as apparent from the following discussions, it is appreciated that throughout the present invention, discussions utilizing terms such as "receiving", "determining", "indicating", "transmitting", "flushing", "repeating," or the like, refer to the actions and processes of a computer system or similar electronic computing device. The computer system or similar electronic device manipulates and transforms data, represented as physical (electronic) quantities within the computer system's registers and memories, into other data, similarly-represented as physical quantities within the computer system memories, into other data similarly represented as physical quantities within the computer system memories or registers or other such information storage, transmission, or display devices. Unless specifically stated otherwise, data packets further refer to a block of data that is sent over a network, each containing sender, receiver, and error control information in addition to an actual message.

Figure 1:
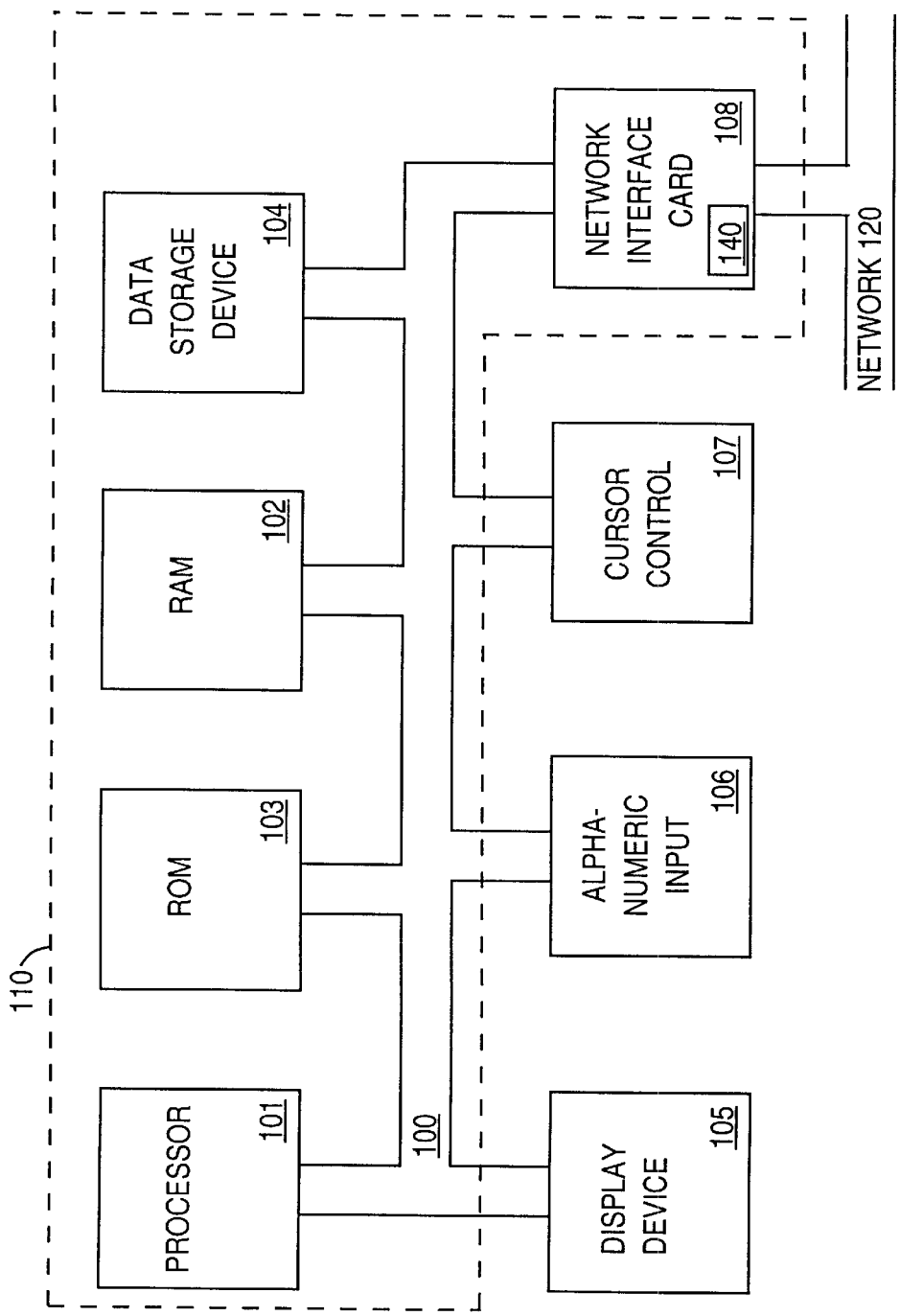
FIG. 1 illustrates a block diagram of a computer system upon which one embodiment of the present invention may be practiced.

Portions of the present invention are comprised of computer-readable and computer-executable instructions which reside in, for example, computerusable media of a computer system. FIG. 1 illustrates an exemplary computer system 110 upon which one embodiment of the present invention may be practiced. It is appreciated that system 110 of FIG. 1 is exemplary only and that the present invention can operate within a number of different computer systems.

System 110 of FIG. 1 includes an address/data bus 100 for communicating information and a central processor unit 101 coupled to bus 100 for processing information and instructions. Central processor unit 101 may be an 80x86-family microprocessor. System 110 also includes data storage features such as computer-usable volatile memory 102, e.g. random access memory (RAM), coupled to bus 100 for storing information and instructions for central processor unit 101; computer usable non-volatile memory 103, e.g. read only memory (ROM), coupled to bus 100 for storing static information and instructions for the central processor unit 101; and a data storage device 104 (e.g., a magnetic or optical disk and disk drive) coupled to bus 100 for storing information and instructions. System 110 of the present invention also includes an optional alphanumeric input device 106, including alphanumeric and function keys, which is coupled to bus 110 for communicating information and command selections to central processor unit 14. System 110 also includes an optional cursor control device 107, coupled to bus 100 for communicating user input information and command selections to central processor unit 101. System 110 of the present embodiment also includes an optional display device 105, coupled to bus 100 for displaying information. Significantly, a network interface card (NIC) 108 coupled to bus 100 is connected to a network 120 and controls the flow of information over network 120. Data packets, such as ethernet packets, that are incoming arrive at NIC 108 via network 120 and are stored in FIFO memory 140 of NIC 108 before being transferred to other hardware and software of computer system 110. A more detailed discussion of NIC 108 in furtherance of the present invention is found below.

Figure 2:
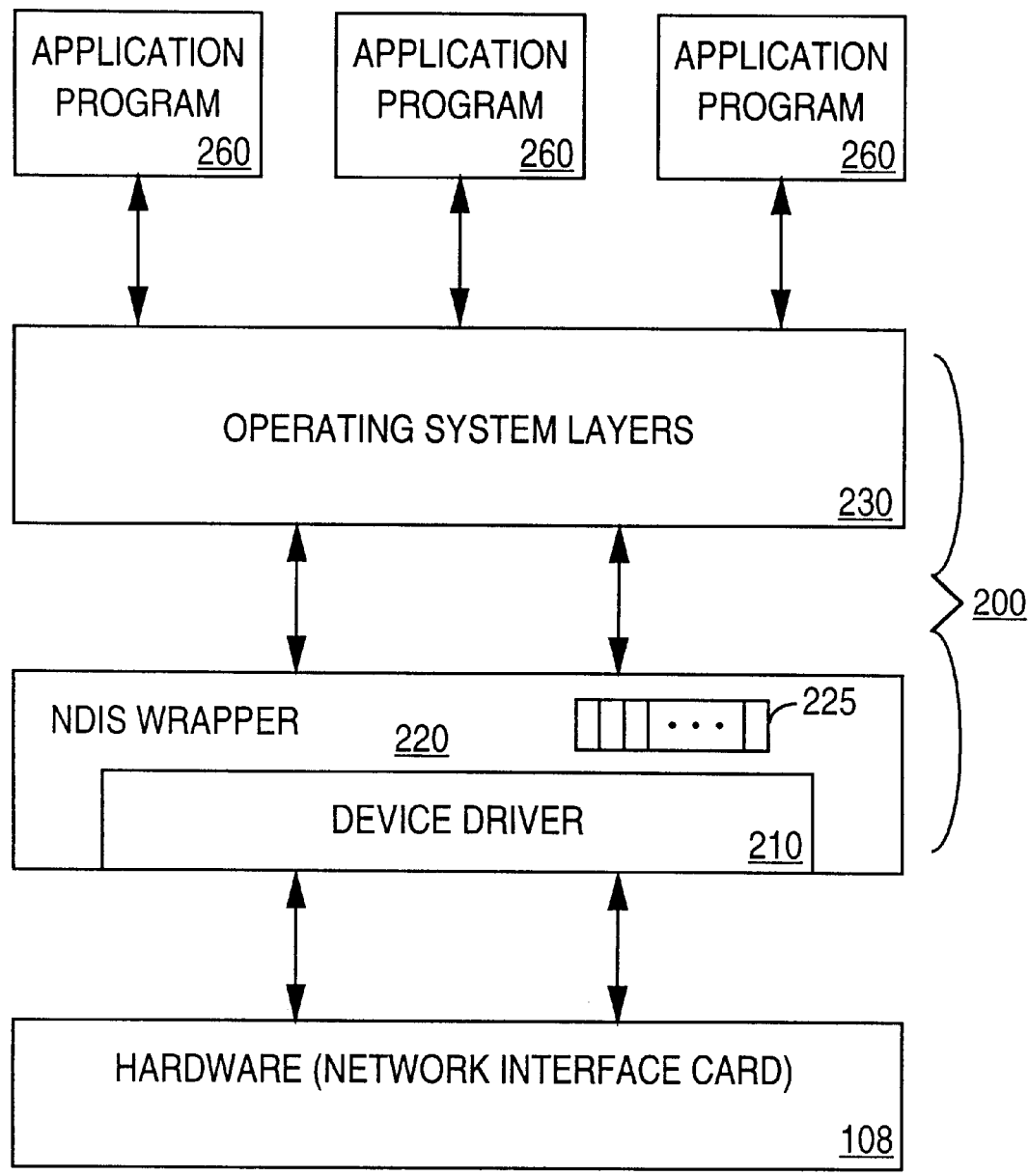
FIG. 2 illustrates the different operating layers associated with the computer system as illustrated in FIG. 1 in furtherance of one embodiment of the present invention.

FIG. 2 is a block diagram that represents the different layers of a host operating system 200 operable on computer system 110. Host operating system 200 includes a network device driver 210 that operates NIC 108 and moves data packets between NIC 108 and other hardware and software of computer system 110. Implemented directly above network device driver 210 is an NDIS wrapper 220. NDIS wrapper 220 primarily arbitrates the control of network device driver 210 between various application programs 260. Significantly, NDIS wrapper 220 is configured to control and access buffers 225, which may be an area of RAM 102 set aside for receiving data packets. Implemented above NDIS wrapper 220 are other operating system layers 230, including system kernel, memory managers, etc., which provide services to application programs 260.

In operation, when data packets arrive at NIC 108, network device driver 210 will initiate a data transaction and will indicate to NDIS wrapper 220 that there are incoming data packets waiting to be received. Usually, NDIS wrapper 220 will acknowledge the presence of the incoming data packets and will signal network device driver 210 to transfer the packets to buffers 225. When all the data packets have been transferred, network device driver 210 then signals NDIS wrapper 220 that the transaction is complete. In particular, an NdisMIndicateReceiveComplete routine is called at the end of the transaction. NdisMIndicateReceiveComplete will copy the contents of buffers 225 to other portions of RAM 102. Thereafter, buffers 225 will be flushed (emptied) to make room for new incoming data packets.

One limitation of the NDIS, as implemented in some operating systems, such as Windows 95™, data packets are sometimes lost during the transfer. The inventor of the present invention, recognizing this problem, realized that packet loss is caused by the operating system's inability to receive more than a certain number of data packets in one transaction. In particular, the inventor discovered that Windows 95™ is limited to processing eight data packets per NdisMIndicateReceiveComplete call. Once eight data packets have been received, any additional data packets that are attempted to be transferred by the network interface card will be ignored. As a result, data packets are frequently lost and have to be resent. This causes extremely poor performance under heavy network traffic.

The aforementioned limitation of NDIS wrappers is circumvented by the present invention. According to one embodiment of the present invention, a plurality of incoming data packets are initially received by NIC 108 from network 120 and are stored temporarily within FIFO 140 of NIC 108. The data packets are then transferred from NIC 108 to buffers 225 of NDIS wrapper 220 in bursts of N data packets, where N is a maximum number of data packets that can be received by NDIS wrapper 220 per transaction without packet loss. Significantly, at the end of each burst, a future hardware interrupt is scheduled. Further, at the end of each burst, a signal falsely indicates that all the incoming data packets have been transferred to NDIS wrapper 220.

Essentially, according to the present embodiment, after receiving the NdisMIndicateReceiveComplete call, NDIS wrapper 220 will copy the contents of buffers 225 to other areas of RAM 102, and flush (empty) buffers 225. Control of the computer system 110 is then Teleased to host operating system 200. Subsequently, when the future hardware interrupt occurs, host operating system 200 will be triggered to transfer a next burst of data packets. Since buffers 225 have been flushed, NDIS wrapper 220 will be enabled to receive the next burst of the data packets. In the present embodiment, the signal is generated by calling the NDIS routine NdisMIndicateReceiveComplete. Further, the process may be repeated until all the data packets have been transferred.

Figure 3:
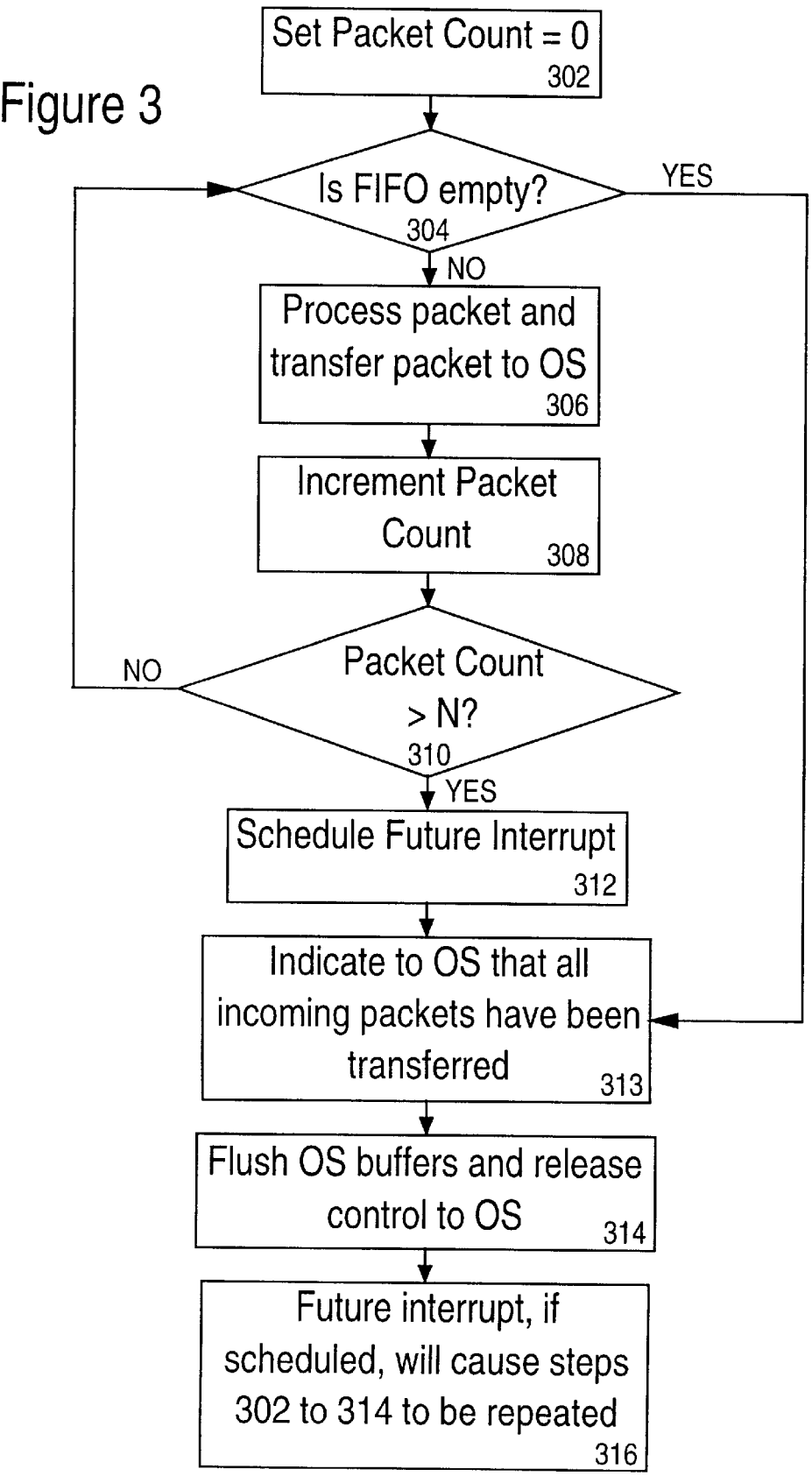
FIG. 3 illustrates a flow diagram of one embodiment of the present invention.

FIG. 3 is a flow diagram describing a process for transferring data packets according to one embodiment of the present invention. In step 302, a variable PACKET COUNT is initially set to zero. The variable PACKET COUNT is used to keep track of a number of data packets that have been processed and transferred to host operating system 200.

Step 304 checks FIFO 140 and determines whether there is an incoming packet waiting to be transferred to the host operating system 200. The method of detecting a data packet that is waiting to be transferred to a host operating system is well known in the art, and maybe hardware dependent.

In step 306, if there is an incoming packet, the data packet is processed and transferred to host operating system 200. According to the present embodiment, when a data packet is processed, header information is stripped, and the body of the data packet is copied to buffers 225 within NDIS wrapper 220.

If FIFO 140 is empty, the data packets transfer process is completed, and, in step 313, NdisMIndicateReceiveComplete is called. Thereafter, in step 314, buffers 225 of NDIS wrapper 220 are flushed, and control of computer system 110 is returned to host operating system 200.

In step 308, after the data packet is processed, PACKET COUNT is incremented.

In step 310, it is determined whether PACKET COUNT is larger than a predetermined number, N. According to the present embodiment, if PACKET COUNT is not larger than N, then more data packets may be processed. Therefore, step 304 to step 310 are repeated for another data packet until PACKET COUNT is larger than N. In one embodiment of the present invention implemented in Windows 95™, N is preferably 7 such that data packets are processed in bursts of 8.

If it is determined that PACKET COUNT is larger than N, then N+1 packets have already been processed and moved to buffers 225. According to the present embodiment, additional data packets will not be received by host operating system 200. Therefore, in step 312, a future hardware interrupt is scheduled. As discussed above, when the future hardware interrupt occurs, a next burst of the data packets may be transferred. Preferably, the future hardware interrupt is scheduled almost immediately after the current process ends such that the bursts of data packets may appear to arrive continuously. For instance, in the present embodiment, the future hardware interrupt may be scheduled to occur 200 μsec after the current burst of data packets have been processed and transferred.

In step 313, NdisMIndicateReceiveComplete is called to indicate falsely to host operating system 200 that there are no more data packets waiting to be received. NdisMIndicateReceiveComplete also triggers NDIS wrapper 200 to flush buffers 225 in step 314. Accordingly, when the future hardware interrupt occurs, buffers 225 will be available to receive the next burst of data packets. In addition, in step 314, control of computer system 110 is released to host operating system 200.

In step 316, if a future hardware interrupt is scheduled, step 302 to step 314 are repeated when the future hardware interrupt occurs. Step 302 to step 314 are repeated until all data packets are processed and transferred.

It should also be noted that, in the present embodiment, the technique for scheduling a future hardware interrupt is well known in the art. Further, the operations of the future hardware interrupt would be completely transparent to application programs 160. From an application program's viewpoint, the next burst of data packets would appear to have newly arrived from network 120.

The aforementioned packet loss problem may also be solved by an alternate embodiment of the present invention. According to the alternate embodiment, a plurality of incoming data packets arriving at NIC 108 are processed in bursts of N packets, where N is a maximum number of data packets that can be received by NDIS wrapper 220 without packet loss. At the end of each burst, a signal is sent to NDIS wrapper 220 falsely indicating that all of the incoming data packets have been transferred. The signal will also trigger NDIS wrapper 220 to move the contents of buffers 225 to other areas of RAM 102, and to flush (empty) buffers 225. As a result, buffers 225 can be used to receive the next burst data packets, and the process may be repeated until all the data packets are transferred.

Figure 4:
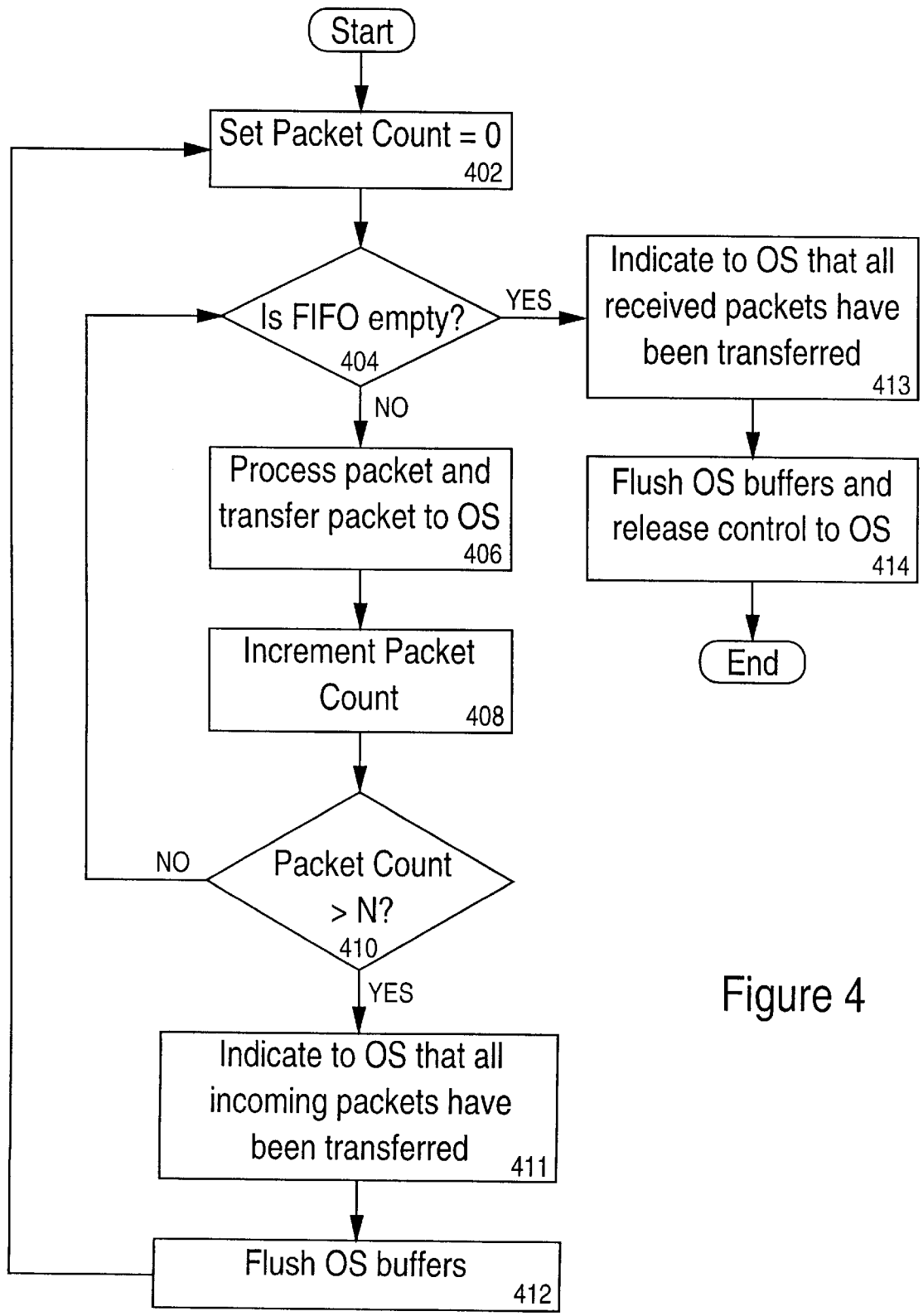
FIG. 4 illustrates a flow diagram of another embodiment of the present invention.

FIG. 4 is a flow diagram illustrating a process for transferring data packets according to an alternate embodiment of the present invention. In step 402, a variable PACKET COUNT is initially set to zero. The variable PACKET COUNT is used to keep track of the number of data packets that have been processed and transferred to host operating system 200.

Step 404 checks FIFO 140 and determines whether there is an incoming packet waiting to be transferred to host operating system 200. As discussed above with, respect to Step 304, the method of detecting data packets that are waiting to be transferred is well known in the art, and may be hardware dependent.

In step 406, if there is an incoming data packet, the data packet is processed and control is released to host operating system 200. If all the incoming data packets have been processed, step 414 will be carried out. In step 414, the transaction is completed, and NdisMIndicateReceiveComplete will be called. Thereafter, control is released back to the host operating system 200, and the process ends.

If FIFO 140 is empty, the data packets transfer process is completed and, in step 413, NdisMIndicateReceiveComplete is called. Thereafter, in step 414, buffers 225 of NDIS wrapper 220 are flushed, and control of computer system 110 is returned to host operating system 200.

In step 408, after the data packet is processed, PACKET COUNT is incremented.

In step 410, it is determined whether PACKET COUNT is larger than a predetermined number, N. According to the present embodiment, if PACKET COUNT is not larger than N, then more data packets may be processed. Therefore, step 404 to step 410 are repeated for another data packet until PACKET COUNT is larger than N. In one embodiment of the present invention implemented in Windows 95™, N is preferably 7 such that data packets are processed in bursts of eight.

If it is determined that PACKET COUNT is larger than N, then N+1 packets have already been processed. Thus, host operating system 200 may not be able to receive additional data packets. Therefore, in step 411, NdisMIndicateReceiveComplete is called to indicate falsely to host operating system 200 that all the incoming data packets have been transferred. NdisMIndicateReceiveComplete also triggers NDIS wrapper 220 to flush buffers 225 in step 412. In this way, there will be enough buffer space for receiving another burst of data packets. Steps 402–412 are then repeated until all of the incoming data packets have been transferred. As discussed above, N is preferably 7 when the present invention is implemented in a system running Windows 95™. It should also be noted that the operations of the present invention would be completely transparent to application programs 160.

A method of preventing packet loss when data packets are transferred from a network interface card to an operating system of a computer has thus been disclosed. The present invention recognizes the limitations of NDIS wrappers as implemented in some operating system and circumvents these limitations by sending data packets in bursts and flushing the buffers in the operating system after each burst. Because the present invention is easy to implement within the device driver of hardware interface cards, extensive modification to the existing operating system is unnecessary. In addition, the present invention is completely transparent to application programs. Consequently, the present invention is completely compatible with all existing operating systems and application programs. Although particularly embodiments of the present invention has been described in conjunction the Windows 95™ operating system, it shall be apparent to those ordinarily skilled in the art, upon reading the present disclosure, that the present invention may be practiced in other computer operating systems as well.

What is claimed is:

1. In a computer system, a method of preventing packet loss during transfer of a plurality of data packets between a network interface card and a host operating system of the computer system, the method comprising the steps of:
    a) transferring a burst of the data packets from the network interface card to a buffer controlled by the operating system, wherein the burst includes at most a maximum number of data packets the buffer is capable of receiving without packet loss; and
    b) sending a signal to the operating system, the signal falsely indicating to the operating system that all of the plurality of the data packets have been transferred, wherein the signal causes the operating system to flush the buffer such that a next burst of the data packets can be received without packet loss.

2. The method according to claim 1 further comprising the step of:
    c) repeating step (a) and step (b) until all of the plurality of data packets are transferred.

3. The method according to claim 1 further comprising the step of:
    d) scheduling a future hardware interrupt after step (a), wherein the future hardware interrupt triggers the operating system to repeat step (a), step (d) and step (b) until all of the plurality of data packets are transferred.

4. The method according to claim 1 wherein the operating system is compatible with x86-family microprocessors.

5. The method according to claim 4 wherein the buffer is controlled by an NDIS wrapper of the operating system.

6. The method according to claim 1 wherein the signal is generated by an NDIS routine NdisMIndicateReceiveComplete.

7. In a computer system, a method of preventing packet loss when data packets are transferred from a network interface card to a host operating system, the method comprising the steps of:
    a) receiving a plurality of data packets from a network;
    b) transferring a burst of the data packets to the host operating system, wherein the burst includes fewer data packets than the plurality, further wherein the burst includes at most a maximum number of data packets the operating system can receive without packet loss;
    c) processing the burst of the data packets;
    d) sending a signal to the host operating system, the signal falsely indicating to the host operating system that the processed data packets constitute all of the data packets received from the network, wherein the signal enables the host operating system to process additional data packets without packet loss; and
    e) scheduling a future transaction, wherein a next burst of the data packets will be received by the host operating system at the future transaction.

8. The method according to claim 7 further comprising the step of:
    f) repeating step (b) through step (e) until the plurality of data packets are processed.

9. The method according to claim 7 further comprising the step of:
    g) temporarily storing the processed data packets within a buffer controlled by an NDIS wrapper of the host operating system.

10. The method according to claim 9 further comprising the step of:
    h) flushing the buffer after step (d) such that the buffer is available to receive the next burst of data packets.

11. The method according to claim 10 wherein the signal triggers the host operating system to flush the buffer.

12. The method according to claim 7 wherein the signal is generated by an NDIS routine NdisMIndicateReceiveComplete.

13. The method according to claim 7 wherein the operating system is compatible with x86-family microprocessors, further wherein the maximum number is eight.

14. In a computer system, a method of preventing packet loss when data packets are transferred from a network interface card to a host operating system, the method comprising the steps of:

a) receiving a plurality of data packets from a network;

b) transferring a burst of the data packets to the host operating system, wherein the burst includes fewer data packets than the plurality, further wherein the burst includes at most a maximum number of data packets the host operating system can receive without packet loss;

c) processing the burst of the data packets;

d) sending a signal to the host operating system, the signal falsely indicating to the host operating system that the processed data packets constitute all of the data packets received from the network, wherein the signal enables the host operating system to process additional data packets without packet loss; and e) processing a next burst of the data packets after step (d).

15. The method according to claim 14 further comprising the step of:

f) repeating step (a) through step (d) until the plurality of data packets are processed.

16. The method according to claim 14 further comprising the step of:

g) temporarily storing the processed data packets within a buffer controlled by an NDIS wrapper of the host operating system.

17. The method according to claim 16 further comprising the step of:

g) flushing the buffer after step (d) such that the buffer is available to receive the next burst of the data packets.

18. The method according to claim 14 wherein the signal is generated by an NDIS routine NdisMIndicateReceiveComplete.

19. The method according to claim 18 wherein the signal triggers the NDIS wrapper to flush the buffer.

20. The method according to claim 18 wherein the operating system is compatible with x86-family microprocessors, further wherein the maximum number is eight.

21. A computer-usable medium having computer-readable program code embodied-therein for causing a computer to perform the steps of:

a) receiving a plurality of data packets from a network;

b) transferring a burst of the data packets to a host operating system, wherein the burst includes fewer data packets than the plurality, further wherein the burst includes at most a maximum number of data packets the operating system can receive without packet loss;

c) processing the burst of the data packets;

d) falsely indicating to the host operating system that the burst of the data packets constitute all of the data packets received from the network; and e) repeating step (b) through step (d) until all of the data packets.

22. The computer-usable medium as recited in claim 21 having computer-readable program code for causing the computer to further perform the steps of:

f) scheduling a future transaction, wherein a next burst of the data packets are transferred to the operating system at the future transaction.

23. The computer-usable medium as recited in claim 21 having computer-readable program code for causing the computer to further perform the steps of:

g) temporarily storing the processed data packets within a buffer controlled by an NDIS wrapper of the host operating system.

24. The computer-usable medium as recited in claim 23 having computer-readable program code for causing the computer to further perform the steps of:

h) flushing the buffer after step (d) such that the buffer is available to receive the next burst of data packets.

25. The computer-usable medium as recited in claim 24 wherein the buffer is flushed by an NDIS routine NdisMIndicateReceiveComplete.

26. The method according to claim 25 wherein the operating system is compatible with x86-family microprocessors, further wherein the maximum number is eight.

* * * * *